United States Patent Office 2,948,523
Patented Aug. 9, 1960

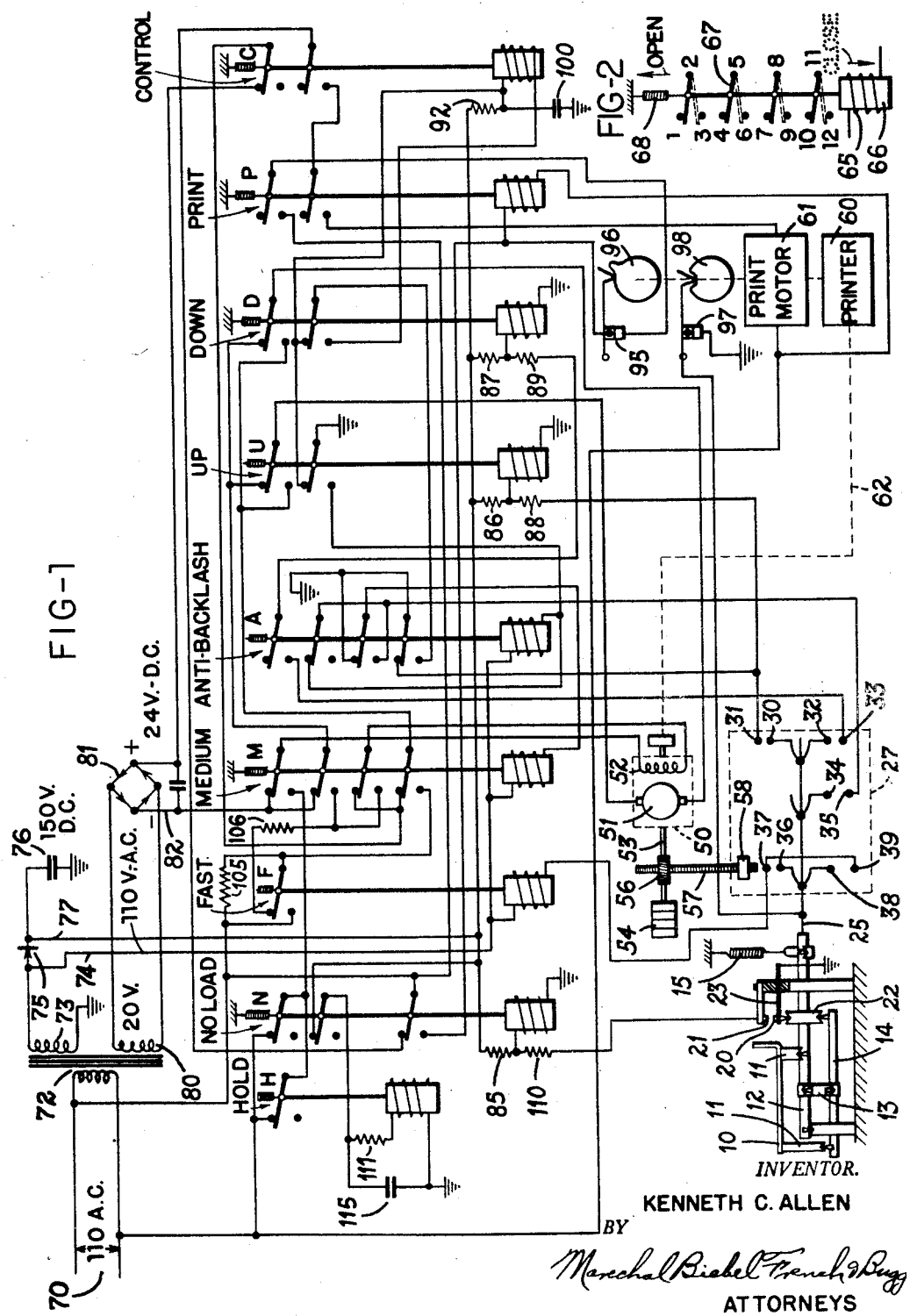

2,948,523
COMPUTING SCALE

Kenneth C. Allen, Dayton, Ohio, assignor to The Hobart Manufacturing Company, Troy, Ohio, a corporation of Ohio Filed Aug. 24, 1953, Ser. No. 376,136

17 Claims. (Cl. 265—5)

This invention relates to computing scales and more particularly to a power operated scale for computing, indicating, and providing a printed record of a weighing transaction at a selected unit price.

It is the principal object of the invention to provide a scale having power operated means for actuating indicators, printing mechanism, and the like, which responds quickly and accurately to the weighing operation of the scale and which develops adequate power for operating the indicator, or printing a ticket, as may be desired, to provide a record of the transaction.

It is a further object to provide such a scale in which the effect of vibrations to which the scale may be subjected is reduced or eliminated, the scale responding only to the application of a weight, and not to mere vibrations of the mechanism or the support on which it rests.

It is also an object to provide controls for operating the power drive mechanism swiftly, without hunting, and providing for the accurate and rapid stopping of the drive when the balance point is reached.

It is a further object to provide for transferring the source of electrical energizing from a high speed to a low speed connection, including preferably an intermediate drive speed also, and for dynamically braking the drive motor when decelerating to a stop condition.

It is a still further object to provide such a scale which avoids backlash difficulties and in which the scale comes to rest always while moving in the same direction of travel, such as while traveling downward.

It is an additional object to provide a scale in which the removal of the article from the scale following its weighing leaves the scale and power operating mechanism in its previous position for a limited period sufficient to place the next article on the scale, without returning to its zero position, thereby avoiding the time required for such return and the unnecessary driving of the mechanism from a previous weight position to zero, and back to another weight position.

It is another object to provide a scale in which the application of a different weight, either larger or smaller than the previous article, within the normal period of delay, will terminate that delay and cause the scale immediately to complete the weighing operation of the next article.

Other objects and advantages will become apparent from the following description, the accompanying drawings, and the appended claims.

In the drawings—

Fig. 1 is a combined schematic and diagrammatic view showing the essential features of the scale mechanism in association with the power drive, the indicating and printing mechanism, and the circuits which provide for the desired operations; and Fig. 2 is an illustrative view indicating the terminology and nomenclature employed in connection with the several relays involved in the system.

Referring to the drawings, which disclose a preferred embodiment of the invention, the scale is shown diagrammatically in Fig. 1 as comprising a platter 10 for receiving the article to be weighed. The platter is supported through vertical members 11 on a double lever system comprising the main lever 12, floating links 13 and secondary lever 14. Any other lever arrangement such as a single lever and check link may be employed if desired, and likewise any suitable form of counterbalance may be used, a spring 15 being shown as connected to the lever and forming therewith the essential elements of the weighing mechanism.

A movable contact 20 cooperates with fixed contact 21 forming a switch that is open when the scale is without weight in the platter. As shown such contact 20 is associated with the fulcrum strut 22 of the secondary lever and is carried on a light spring arm 23 insulated from the scale but could be placed at any location between the platter and its supports. Application however of a weight in excess of a predetermined small amount to the platter 10 will cause contacts 20 and 21 to close and remain closed as long as the weight is on the platter. As shown contact 20 is grounded to the frame of the mechanism.

The lever 12 has an extension arm 25 which carries a series of contacts each mounted on spring arms, and arranged to travel upwardly or downwardly in accordance with the deflections of the lever. These spring contacts are mounted adjacent cooperating contacts carried on a contact carrying assembly 27 which functions as a follow-up device. The contacts on arm 25 include an upper contact 30 cooperating with a closely spaced contact 31 on assembly 27, and a lower contact 32 similarly cooperating with a closely spaced contact 33 on assembly 27. Upon slight upward movement of arm 25 relative to assembly 27 it will be evident that contacts 30 and 31 will close, and conversely on slight downward movement contacts 32 and 33 are closed.

Arm 25 also carries lower contact 34 arranged to cooperate with contact 35 on assembly 27, the spacing between contacts 34 and 35 being somewhat greater than that between contacts 32 and 33 and thereby requiring a greater deflection of the lever before closing of the circuit takes place.

Still further, arm 25 carries upper contact 36 cooperating with contact 37, and lower contact 38 cooperating with contact 39 on assembly 27, the spacing between such respective pairs being still greater so that they will not close until a further deflection of the lever takes place.

The power operating mechanism includes a drive motor 50 having an armature 51 and a field 52. The motor has a shaft 53 which is directly connected to an indicator or counter shown diagrammatically at 54. Such indicator may be of the type having multiple drums on which figures appear corresponding to the amount of rotation of the shaft, to furnish a direct reading indication varying in relation to the weight of the article on the scale.

Shaft 53 operates through worm gearing 56 to drive a screw 57 which turns on nut 58 to raise or lower the contact assembly 27. Thus in response to the operation of motor 50, the contact assembly 27 is raised or lowered, carrying with it the series of contacts 31, 33, 35, 37 and 39 which function as a follow-up device, as will be more fully described hereinafter.

A printer is indicated diagrammatically at 60 operated by print motor 61 and connected through shaft 62 with the drive motor 50 so that the printer will be properly set in accordance with weight, through the turning of motor shaft 62, the amount of rotation of which is directly related to the weight of the article.

For purposes of illustration and simplicity of nomenclature, a typical relay is illustrated in Fig. 2, similar to the several relays embodied in the circuit diagram of Fig.

1. Each relay comprises a solenoid or coil 65 which upon being energized attracts its armature 66, pulling the armature down, and actuating the relay to what is identified as its closed position. One or more switch arms 67 are connected to the armature and are considered as pivoting about their right hand ends, moving from their open or full line position to their closed or dotted line position in response to such energization. Spring means 68 normally returns the switch arms to their upper or open positions. Further, the contacts are designated in the manner shown, that is, the topmost switch arm in the open position completes a circuit between contacts 1 and 2, and in the closed position completes a circuit between contacts 2 and 3. The second switch arm extends from contact 5 and moves from open position against contact 4 to closed position against contact 6, similar connections being established by each of the switch arms of the relay.

The main power supply is indicated at 70 which may suitably be an ordinary 110 volts A.C. source such as is available in locations where the scale would generally be used. A transformer 72 is provided having one secondary 73 which produces a supply source 74 of 110 volts A.C. separate from the main power source and such that one side thereof can be grounded to the frame of the scale without danger of shock with the other side furnishing power for operating controls. A source of high voltage D.C. is likewise desired and for this purpose a selenium rectifier 75 is connected through condenser 76 to ground, thereby furnishing a source 77 of approximately 150 volts D.C. likewise for control purposes.

A lower voltage direct current supply is likewise desired and to provide this the transformer also incorporates another secondary winding 80 developing about 20 volts which supplies the full wave rectifier 81, the opposite terminals of which furnish a source 82 of about 24 volts direct current as used in the system.

Assuming now that the scale is unloaded and with power supplied through the various circuits, the following conditions exist. Since there is no load on the platter, contacts 20 and 21 are open, so that an energizing circuit is completed for the coil of No Load relay N from source 77 through series resistor 85 and through coil N to ground. The N relay is thus closed. The Hold relay H is open because its only source of power is through contacts N4 and N5, which circuit is broken. Fast relay F is open since its energizing circuit is broken at contacts 36, 37 and 38, 39. Up relay U and Down relay D are both closed because they are energized from source 77, through series resistors 86 and 87 respectively, through the operating coils of the relays to ground. It will be noted that relay U has a resistor 88 connected in parallel with its coil but this resistor is ineffective because its circuit is broken at switch contacts 30, 31. Relay D similarly has a resistor 89 in parallel with its operating coil but it also is ineffective because its circuit is opened at switch contacts 32, 33.

The Anti-backlash relay A is closed because it is energized from source 74 through its operating coil and through relay contacts U6 and U5 to ground. The Medium relay M is open because its energizing circuit is through contacts A9 and A8 which are closed, and through switch contacts 34 and 35 which are open.

Control relay C is closed because a circuit is completed from source 77 through resistor 92, the operating coil of relay C, contacts D6 and D5, through contacts A12 and A11 to ground.

Printing relay P is closed through a circuit which is completed from one side of power source 70, switch contacts N8 and N9, through the coil of relay P and back to the other side of source 70. Upon closing, relay P locks itself in through a circuit from the same side of source 70, contacts P3 and P2, through normally closed contacts 95 of a cam switch operated by cam 96 controlled by the print motor 61, thereby providing a bypass for the contacts of relay N as long as the cam switch contacts 95 remain closed.

With both relays U and D in closed position, both sides of the motor armature 51 are connected together, and thus the motor does not run. The field circuit to the motor field 52 is likewise open because its energizing circuit is broken at contacts C1 and C2.

Elimination of vibrations

Vibration of the scale or its mechanism resulting from either the handling of the scale itself or from vibrations or movements of the structure on which it is supported are objectionable in the case of power operated weighing mechanism since it tends to cause undesired response of the drive motor and associated parts to vibrations as distinguished from responding to the application of weight to the scale. In accordance with the present invention the effect of vibration is materially reduced and largely eliminated so that the mechanism distinguishes between mere vibration, and deflection of the weighing mechanism in response to the application of a load. It responds to the latter but makes no response to the former. This will be clear by the following analysis.

Assume that vibration occurs causing the scale lever 12 temporarily and for short intervals to close its respective contacts 30, 31 and/or 32, 33. Closing of contacts 30, 31 for example grounds resistor 88 through a circuit which is completed through normally closed contacts 97 actuated by a cam 98 on the print motor shaft, such contacts being closed except when the printing motor is in operation. The grounding of resistor 88 places it in shunt circuit to the operating coil of relay U. A similar circuit may be traced when contacts 32 and 33 close, grounding resistor 89 in shunt across the operating coil of relay D. The completion of either or both of these shunt circuits reduces the effective voltage on the operating coils of the relays U or D from a normal of about 75 volts to about 4 or 5 volts. This low voltage is not sufficient to maintain the relays in closed condition but because of the inductive effect of the windings of the coils, and the effective short circuiting of the coil by resistor 89, current continues to flow for a fraction of a second and there is a short delay before the flux collapses sufficiently to allow the relays to open. This delay may be varied if desired, a typical example being to provide for a delay of a tenth to a twentieth of a second. Consequently, even severe vibrations of the scale mechanism, sufficient to cause repeated momentary closing of contacts 30—33, will have no effect on the operation of the scale and the motor will remain at rest.

Weighing operation

Assuming now that a weight or load is applied to platter 10, and that the amount of the weight is small, deflection of lever 12 occurs with corresponding downward travel of arm 25 to an extent sufficient only to cause the closing of contacts 32 and 33, but insufficient deflection to cause the closing of either contacts 34, 35 or contacts 38, 39. Closing of contacts 32, 33 completes a circuit from ground, through closed contacts 97, contacts 32, 33 and contacts A3, A2 to resistor 89 which thus reduces the potential applied to the coil of relay D. After the above indicated short delay period, relay D opens, and in doing so its contacts D5 and D6 open the ground circuit for the coil of relay C allowing this relay to open at approximately the same instant. With relays D and C in open position, the low voltage D.C. source 82 supplies the motor field through a circuit from the plus side thereof through contacts C1, C2, contacts M7, M8, through the field winding 52, contacts M2, M1 to the negative side of the source. The motor field is thus energized. Likewise the armature is energized from the same source, through a circuit from the plus side, contacts C1, C2, contacts M10, M11, contacts U3, U2 to the armature, contacts D2 and D1, and contacts M5, M4 to the negative side of the line. The motor is thus energized and runs at slow speed in the direction to turn shaft 53 and to operate screw 57 in the direction to move contact assembly 27 in the downward direction. As this movement continues, it is recorded in counter 54 and likewise provides for actuation of printer 60.

Such conditions continue until the lever stabilizes at a balance position and until the downward travel of the contact assembly 27 results in the opening of switch contacts 32, 33. Promptly upon the opening of these latter contacts the shunt circuit through resistor 89 is broken and the full voltage of source 77 is applied through resistor 87 to the coil of relay D, causing this relay to close immediately. In so doing, the circuit through the armature 51 is broken by the opening of contacts D1 and D2 and with the closing of contacts D2 and D3, the armature is short circuited upon itself through contacts U2 and U3. Thus the scale automatically senses arrival at the balance condition, whatever interval may be required for that operation, and at this time relays U and D are both operated, thereby setting up the conditions for the operation of relay C which in turn controls the printing operation.

The closing of contacts D5 and D6 connects the operating coil of relay C to ground through a circuit including contacts A12 and A11 but a condenser 100 is connected in shunt to the coil and hence the coil does not receive operating voltage immediately, and there is a short time delay during which the charge builds up on condenser 100 through resistor 92. Such condenser 100 has previously been maintained in a discharged condition by a grounded circuit through contacts U4 and U5 or D4 and D5 in combination with A12 and A11, or both. After such delay, which may be of the order of one-half second, the potential has risen sufficiently and relay C closes. Until it does close, however, the energizing circuit for the motor field coil 52 remains as previously described through contacts C1 and C2 and hence a high degree of dynamic braking is produced, causing the motor to come quickly to a stop. This delay not only provides for the dynamic braking but also provides a short period to assure that complete stability of the weighing and power drive mechanisms has been attained. The time delay in the operation of relay C requires that the scale remain in balance for this brief interval before the printing operation begins and if for any reason there is a disturbance the time interval is reestablished. Upon operation, relay C conditions the circuit for the prompt initiation of the printing operation without further delay or any manual operation. It will be seen from the above that it is impossible for the scale to print unless it is in balance and that if anything disturbs that balance or if an attempt should be made to tamper with the weight, relay C will not operate and the printing operation cannot take place.

*Printing operation*

In response to the closing of control relay C, its contacts C5 and C6 supply power through a circuit from one side of source 70, contacts N8 and N7 of relay N which is open, contacts C5 and C6, contacts P5 and P6 to the printer motor 61 and back to the other side of source 70. This actuates the motor to perform a printing cycle causing the printing of a ticket showing the weight corresponding to the condition established by the turning of shaft 62. Immediately upon the start of the printing operation contacts 97 are opened by the action of cam 98 thus disabling the entire series of control contacts 30—39 so that nothing which takes place on the printer or weighing mechanism of the scale will affect the weight indication or the cycle of printing, and hence the scale and the power drive thereof remain at rest regardless of what may be done to the load on the platter. This likewise disables the U and D relays so that nothing can happen to disturb the closed condition of place. As the balance point is approached, contacts the C relay during the printing operation which thus continues through one cycle until cam 96 opens contacts 95. When this occurs the locking circuit for the coil of relay P is broken and relay P opens and remains open even during the coasting of the printing motor which does carry far enough to result in the closing of switch contacts 95. The printer is now restored to its home position and contacts 97 have closed and the scale is ready to be operated or to start operating automatically if the balance condition is disturbed. The printer, however, cannot recycle until the load has been removed from the platter thus opening contacts 20 and 21 and causing the N relay to close, resetting and locking the P relay. Furthermore the printer will not operate at zero load even though the scale is in balance because of the closed position of the N relay which breaks the printer source of power through contacts N7 and N8.

Thus the system prevents operation of the printer at zero load, prevents operation of the printer while the scale is in an unbalanced position, prevents operating of the scale while the printer is in action, and prevents recycling of the printer until the weight has been removed from the platter.

*Weighing of larger loads*

Assuming now that a somewhat larger load has been placed on the platter resulting in the deflection of lever 12 and arm 25 sufficiently to cause the closing of both contacts 32, 33 and 34, 35. Closing of contacts 32, 33 provides for the closing of relay D after the previously described short delay interval. Closing of contacts 34, 35 completes an energizing circuit for the coil of relay M which may be traced from source 74 through the operating coil of relay M, contacts A8, A9 and contacts 35, 34 to ground through closed contacts 97. Relay M thereupon closes resulting in changing the connections to motor 50 from a direct current shunt connection to a modified series motor directly connected to the A.C. source 70. This circuit may be traced from one side of source 70, resistor 105, contacts M12, M11, contacts D3 and D2, the armature 51 of the motor, contacts U2, U1, contacts M5, M6, M9, M8, the field winding 52 of the motor, contacts M2, M3, contacts H2 and H1, or N2 and N1, to the other side of the line. Since relay F is open, resistor 106 is also connected through contacts F1 and F2 in such a manner that it is in shunt across the armature 51, resistor 105 being in series with the combination and with the motor field and armature being in series with each other. This connection results in a slower speed operation of the motor than would be the case if resistors 105 and 106 were not present, but a substantially faster operation than when the motor was connected for slow speed. The series resistor 105 reduces the speed of the series connected motor in the normal manner and the resistor 106 connected in shunt to the armature increases the torque at such lower speed by reason of creating a stronger field. Under these conditions the system operates at medium speed with the motor connected as a series motor and traveling substantially faster than its slow speed condition.

*Application of maximum load*

Application of a still greater load to the scale results in the closing of contacts 38, 39 which complete an energizing circuit for the coil of relay F from source 74 through the coil, through contacts 38, 39 and closed contacts 97 to ground. Upon the closing of relay F, its contacts F2 and F3 short circuit resistor 105, and the opening of contact F1 opens the circuit to resistor 106. This causes motor 50 to operate at maximum or full speed as a series connected motor.

*Dynamic braking*

As the contact assembly 27 travels downward at maximum speed, the following sequence of operations takes 38 and 39 open, resulting in the opening of relay F. This results in the reinsertion of series resistor 105 and in the shunt connection of resistor 106 across the motor armature. In such connection resistor 106 serves as an effective dynamic brake and quickly slows the travel of the motor from high speed to medium speed. Further travel of the motor continues at medium speed until contacts 34 and 35 open, which results in the opening of relay M, disconnecting the motor from its A.C. supply source 70, and reconnecting it for operation as a D.C. shunt motor to source 82. Because of the shunting effect of the field on the armature dynamic braking again takes place, quickly slowing the motor from medium to slow speed. Further travel continues at slow speed, with the final stopping of the motor with dynamic braking in response to the opening of contacts 32, 33 at the balance point, in the manner described above. Also as described the printing operation then takes place.

Anti-backlash feature

Since the power drive motor 50 operates through gearing to control the indicator, the travel of the contact assembly 27 and the printer, it is desirable to provide for stopping of the system at the balance point only while traveling in one predetermined direction. Normally the scale will be deflected downward by the application of a weight, and the motor 50 will operate to cause the contact assembly 27 to travel downwardly with corresponding actuation of indicator 54. As the balance point is approached, the speed of this operation is progressively reduced and under normal conditions the balance point is reached without over-travel. Hence the various parts of the mechanism including the gearing are not subject to errors due to backlash. If however the scale should over-travel, the controls would provide for the reverse operation, and if the balance point were reached while traveling in the reverse direction, the mechanism would be subject to backlash errors. Accordingly means are provided in accordance with the invention for bringing the scale to a final balance only when traveling in the same direction, that is, the normal direction of increasing weight or in the downward direction.

Assuming the scale has over-traveled, the closing of contacts 30, 31 results in the opening of relay U and the opening of contacts U5 and U6. This breaks the circuit for the energizing of relay A, causing that relay to open. Upon opening, relay A establishes a bridging circuit across contacts 30, 31 through its contacts A10, A11, thereby maintaining the deenergizing circuit for the coil of relay U, regardless of the condition of contacts 30,31. The opening of contacts A2, A3 disconnects the energizing circuit for the D relay from control of contacts 32, 33 so that the D relay cannot be opened even though contacts 32, 33 should close. The opening of contacts A8, A9 and the closing of contacts A8 and A7 disconnects the circuit for the energizing of the coil of relay M from its normal control contacts 34, 35 and locks relay M in its closed position. The A.C. power source 70 is thus connected to the motor in the same manner as described above with the motor field and armature being connected in series, but with relay U open and relay D closed, the connections to the motor armature are reversed and thus the motor is connected for medium speed operation in the up direction, being energized through the resistor 105 in the circuit of supply source 70 and with resistor 106 connected in shunt with its armature.

At the same time the opening of relay A has connected contacts 34, 35 through contacts A5, A4 to its own operating coil in such a manner that when contacts 34, 35 are again closed relay A will close. The scale now proceeds upward at medium speed through the balance point and beyond that point until it has over-traveled sufficiently in the upward direction to cause the closing of contacts 34, 35. It may be pointed out that if the unbalance is sufficient to result in the closing of contacts 36, 37, this upward travel will take place at fast or high speed, progressing to medium speed when contacts 36 and 37 open, until such time as contacts 34 and 35 are closed.

When this point is reached, relay A closes, thereby unlocking relays U and D and restoring contacts 34, 35 to their normal function of controlling relay M. With relays U and D unlocked, contacts 32 and 33 assume control and the scale then proceeds on its normal downward stroke until these contacts open at the balance point, thereby assuring that the scale will come to balance only while traveling in the downward direction.

Removal of load from the scale

Upon removal of the load from the scale a sequence takes place similar to that described above in connection with the anti-backlash feature, and motor 50 travels in the reverse or upward direction at either medium or fast speed. In addition to this contacts 20 and 21 will open if the entire load is removed.

Holding function

In the repeated weighing of articles of somewhat similar weights, removal of each article at the end of its weighing operation would normally cause the scale to start its upward movement and that movement would continue until the scale had reached balance at the zero position. Thereafter when the next article was placed on the platter the scale would start from zero and go through the complete weighing operation to reach balance at the new weight, perhaps almost the same as the first weight. This would result in excessive and unnecessary functionings of the mechanism as well as loss of time while the scale went through the operations necessary to rebalance at the new load. In accordance with the present invention the necessity for returning to zero between successive weighings is eliminated, and means are provided which will retain the scale without returning to zero for a limited period of time following the removal of one article, and affording a sufficient opportunity to place another article on the weighing platter. The scale then starts from the position of deflection which it occupied on the basis of the first weighing operation, and without delay either increases or decreases as necessary to arrive at the proper balance point for the weighing of the second article. If after removal of the first weight no new article is placed on the scale for the predetermined interval, the scale then returns to zero and balances at that position.

This is accomplished through the provision of contacts 20, 21 and relays H and N. Contacts 20, 21 are mounted on the fulcrum end of lever 12 on a resilient member such that they will open when there is no load on the platter and will close in response to the placing of a relatively light load thereon.

The scale will operate in the manner already described whether or not contacts 20, 21 are closed. If however the weight on the platter is sufficient to cause these contacts to close, they provide for closing a shunt circuit around the operating coil of relay N through resistor 110 so that after a short delay interval (similar to that described above in connection with relays U and D, and for similar purposes), relay N will open. In so doing it closes its contacts N4 and N5 thereby supplying current from source 77 through resistor 111 to the operating coil of relay H. Relay H immediately closes, opening contacts H1 and H2 and thereby breaking the circuit through which the main alternating current supply 70 was connected to the system. However the opening of relay N caused the closing of its contacts 1 and 2, thereby establishing a parallel path so that the system continues to be supplied and to operate in the normal manner. Hence the scale will respond immediately if the weight on the platter is changed.

Assuming now that the weight is removed from the platter, contacts 20, 21 open and immediately relay N closes thus opening its contacts N1 and N2 and disconnecting the A.C. supply 70. If vibration of the resiliently mounted contacts 20, 21 should occur in conjunction with the oscillation or vibration of the platter and lever system of the scale, the effect of that vibration will be excluded and relay N will respond only to a clear and maintained closing of the contacts as distinguished from the vibratory closing thereof in the manner and for the reasons described above in connection with relays U and D.

Upon the opening of relay contacts N4 and N5 the supply source for the coil of relay H is interrupted but the relay is maintained closed for a definite interval through the connection of a condenser 115 in circuit with resistor 111 and the operating coil, the condenser having been fully charged during the time that relay N was open. Thus relay H does not immediately open and may be caused to remain closed for an interval sufficient to afford an opportunity to remove one article from the scale and to place another thereon, a typical such interval being a period of about five seconds. During this time there is no alternating current supply available for the scale motor since the motor depends solely upon alternating current for travel in the upward direction as described above in the anti backlash feature, and hence the scale cannot run. The scale thus remains where it was when the load was removed. If another load is placed on the platter within the five second delay period, contacts 20, 21 again close, relay N opens, and the scale starts in operation ready for a repetition of the cycle. If no weights are applied to the scale, then at the end of the five second period relay H opens, A.C. power is supplied through contacts H1 and H2, and the scale automatically returns to its zero balance position in the manner described above.

The invention thus provides a novel and highly satisfactory scale mechanism which affords ready and accurate response in relation to the weight, which develops adequate power for the operation of printers and the like, and which is free of objectionable vibration effects. Likewise the scale avoids unnecessary work in a series of weighed operations, and always comes to the balance point from the same direction of travel thereby eliminating objectionable effects of backlash.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A power operating weighing scale having weighing mechanism and a lever adapted to occupy a no-load position and to be deflected away from said position in response to the application of a load to the scale, comprising a plurality of contacts movable with said lever, a follow-up member carrying contacts cooperating respectively with said lever contacts, respective pairs of said contacts being arranged with different spacings from each other providing for closing of a more closely spaced pair upon a small deflection of said lever and the closing of a more widely spaced pair upon a greater deflection of said lever, certain of said contacts being located for closing respectively in response to opposite directions of travel of said lever, a drive motor having a shaft the rotation of which corresponds to the weight, means connecting said shaft to move said follow-up member in response to the rotation of said shaft, means controlled by said respective pairs of contacts for causing said motor to run continuously at high speed in one direction in response to the closing of said widely spaced contacts, means for causing said motor to run continuously at slow speed in the same direction in response to the closing of said closely spaced contacts, means for causing said motor to run at high speed in the opposite direction in response to the closing of said certain contacts, means for stopping said motor in response to the opening of said closely spaced contacts, and means for preventing stopping of said motor when said motor is traveling in said opposite direction and thereby causing operation of said motor in said opposite direction until said shaft has overtraveled sufficiently to effect reversal of the direction of operation of said motor and ultimate stopping of said motor while traveling in said one direction.

2. A power operated weighing scale having weighing mechanism and a lever adapted to occupy a no-load position and to be deflected away from said position in response to the application of a load to the scale, comprising switch contacts mounted on opposite sides of said lever and movable therewith, a follow-up member having oppositely located contacts arranged for cooperation with said pair of lever contacts to be selectively closed in accordance with the direction of movement of said lever, a drive motor having a shaft the rotation of which is proportional to the weight of the load, weight indicating mechanism operable in relation to the rotation of said shaft, means connecting said shaft to cause movement of said follow-up member selectively in accordance with the deflections of said lever to effect the opening of both pairs of said contacts at a balance point when said follow-up member has traveled a distance corresponding to the deflection of said lever, means defining a circuit including one of said pairs of contacts for reversing said motor to return said shaft and follow-up member to their no load position, means responsive to removal of the load from said scale for actuating said circuit means, and means including a part of said circuit means for effecting a time delay in the completion of said circuit following removal of said load and operation of said responsive means and thereby effecting a corresponding time delay in the return of said shaft and follow-up member to their no-load position.

3. A power operated weighing scale having weighing mechanism and a lever adapted to occupy a no-load position and to be deflected away from said position in response to the application of a load to the scale, comprising switch contacts mounted on opposite sides of said lever and movable therewith, a follow-up member having oppositely located contacts arranged for cooperation with said pair of lever contacts to be selectively closed in accordance with the direction of movement of said lever, a drive motor having a shaft the rotation of which is proportional to the weight of the load, weight indicating mechanism operable in relation to the rotation of said shaft, means connecting said shaft to cause movement of said follow-up member selectively in accordance with the deflections of said lever to effect the opening of both pairs of said contacts at a balance point when said follow-up member has traveled a distance corresponding to the deflection of said lever, means defining a circuit including one of said pairs of contacts for reversing said motor to return said shaft and follow-up member to their no-load position, means responsive to removal of the load from said scale for actuating said circuit means, means including a part of said circuit means for effecting a time delay in the completion of said circuit following removal of said load and operation of said responsive means and thereby effecting a corresponding time delay in the return of said shaft and follow-up member to their no-load position, and means responsive during said delay to the application of a new load to said scale for terminating said delay and thereby causing immediate operation of said motor toward a new balance point corresponding to said new load.

4. A power operated weighing scale having weighing mechanism and a lever adapted to occupy a no-load position and to be deflected away from said position in response to the application of a load to the scale, comprising switch contacts mounted on opposite sides of said lever and movable therewith, a follow-up member having oppositely located contacts arranged for cooperation with said pair of lever contacts to be selectively closed in accordance with the direction of movement of said lever, a drive motor having a shaft the rotation of which is proportional to the weight of the load, means connecting said shaft to cause movement of said follow-up member selectively in opposite directions in accordance with the deflections of said lever to effect the opening of both pairs of said contacts at a balance point when said follow-up member has traveled a distance corresponding to the deflection of said lever, printing means controlled by said shaft for printing a record of the weight of each load, means operable automatically to activate said printing means in response to reaching of the balance position by said shaft, means including one of said pairs of contacts for reversing the connections to said motor to return said shaft and follow-up member to their no-load position upon removal of the load from said scale, and means providing a delay in the return of said shaft to its no-load position following removal of said load and the closing of said one pair of contacts.

5. A power operated weighing scale having weighing mechanism and a lever adapted to occupy a no-load position and to be deflected away from said position in response to the application of a load to the scale, comprising switch contacts mounted on opposite sides of said lever and movable therewith, a follow-up member having oppositely located contacts arranged for cooperation with said pair of lever contacts to be selectively closed in accordance with the direction of movement of said lever, a drive motor having a shaft the rotation of which is proportional to the weight of the load, means connecting said shaft to cause movement of said follow-up member continuously and selectively in direction in accordance with the deflections of said lever to effect the opening of both pairs of said contacts at a balance point when said follow-up member has traveled a distance corresponding to the deflection of said lever, anti-backlash means responsive to closing of one of said pairs of contacts for causing said motor to run in one direction continuously until said shaft has overtraveled sufficiently to effect closing of the other of said pair of contacts for operation of said motor in the reverse direction in order to effect stopping of said motor only when said other pair of contacts is opened by travel of said motor in said reverse direction, printing means controlled by the rotation of said shaft for printing a record of the weight, and means operable automatically after said scale has reached a balance condition to activate said printing means.

6. A power operated scale having weighing mechanism and a lever adapted to occupy a no-load position and to be deflected away from said position in response to the application of a load to the scale, comprising a drive motor having a shaft, means including switches located for actuation by said lever forming a circuit controlling the energization of said motor to cause rotation of said shaft in proportion to the load, means responsive to removal of the entire load from said scale for breaking said circuit and thereby blocking operation of said motor to return said shaft to its no-load position, and means for re-establishing said circuit upon application of a second load to said scale.

7. A power operated scale having weighing mechanism and a lever adapted to occupy a no-load position and to be deflected away from said position in response to the application of a load to the scale, comprising a drive motor having a shaft adapted to actuate mechanism providing an indication of the weight, means including switches located for actuation by said lever forming a circuit controlling the energization of said motor to cause rotation of said shaft in proportion to the load, means for automatically breaking said circuit in response to removal of the entire load from said scale in order to deenergize said motor and thereby to leave said shaft in its position corresponding to the weight of said load, and means for re-establishing said circuit upon application of a second load to said scale to reenergize said motor and cause rotation of said shaft selectively in direction and amount corresponding to the difference in said two loads.

8. A power operated scale having a weighing mechanism and a lever adapted to occupy a no-load position and to be deflected away from said position in response to application of a load to the scale comprising a drive motor having a shaft, means operatively associated with said lever to control the energization of said motor in forward or reverse directions selectively in accordance with the deflections of said lever, mechanism, operated by said shaft for producing an indication corresponding to the weight of said load, means responsive to the removal of the load from the scale, and means controlled by said removal responsive means for preventing a second operation of said indicating mechanism until after the removal of the load from said scale.

9. A power operated scale adapted for the rapid weighing of a series of loads and having a weighing mechanism and a lever adapted to occupy a no-load position and to be deflected away from said position in response to the application of a load to the scale, comprising a reversible drive motor having a shaft adapted to be displaced from a no-load position to a position corresponding to the weight on the scale, control means actuated in response to deflections of said lever for selectively controlling the energization of said motor to cause displacement of said shaft in an amount proportional to the load on the scale, switch means responsive to removal of the load from the scale, and means controlled by said switch means following removal of the load for delaying the return of said shaft to its no-load position pending the application of another load to the scale.

10. A power operated scale adapted for the rapid weighing of a series of loads and having a weighing mechanism and a lever adapted to occupy a no-load position and to be deflected away from said position in response to the application of a load to the scale, comprising a reversible drive motor having a shaft adapted to be displaced from a no-load position to a position corresponding to the weight on the scale, control means actuated in response to deflections of said lever for selectively controlling the energization of said motor to cause rapid displacement of said shaft in an amount proportional to the load on the scale, switch means responsive to removal of the load from the scale, means controlled by said switch means following removal of the load for delaying the return of said shaft to its no-load position pending the application of another load to the scale, and means operable in response to the application of another load to the scale for terminating the operation of said delaying means and for causing said shaft to be rapidly displaced to a position corresponding to the other said load.

11. In a power operated scale having a platter and support means for said platter incorporating parts arranged for relative movement in response to application of a load to said platter and including a lever adapted to occupy a no-load balance position and to be deflected to a new balance position corresponding to the load on said platter, the combination of a drive motor having a shaft, means responsive to the deflections of said lever for controlling the energization of said motor in forward or reverse directions selectively to establish a balance position of said shaft corresponding to each balance position of said lever, mechanism operated by said shaft in response to establishment of a balance position thereof for automatically producing an indication of the weight corresponding to said balance position, switch means carried by said relatively movable parts of said platter support means for relative movement between a no-load position when no load is on said platter and a load position in response to relative movement of said parts caused by application of a load to said platter, means maintaining said switch means in said no-load position thereof over a predetermined small range of movement of said lever from said no-load balance position corresponding to a predetermined small weight, and means actuated by said switch means in said no-load position thereof for blocking operation of said indicating mechanism to prevent said automatic operation of said indicating mechanism upon establishment of a balance position of said shaft corresponding to said no-load position of said lever or to a balance position of said lever within said predetermined small range.

12. In a power operated scale having a platter and support means for said platter incorporating parts arranged for relative movement in response to application of a load to said platter and including a lever adapted to occupy a no-load balance position and to be deflected to a new balance position corresponding to the load on said platter, the combination of a drive motor having a shaft, means responsive to the deflections of said lever for controlling the energization of said motor in forward or reverse directions selectively to establish a balance position of said shaft corresponding to each balance position of said lever, mechanism operated by said shaft in response to establishment of a balance position thereof for automatically producing an indication of the weight corresponding to said balance position, switch means carried by said relatively movable parts of said platter support means for relative movement between a no-load position when no load is on said platter and a load position in response to relative movement of said parts caused by application of a load to said platter, means actuated by said switch means in said no-load position thereof for blocking operation of said indicating mechanism to prevent said automatic operation of said indicating mechanism upon establishment of a balance position of said shaft corresponding to said no-load position of said lever, means biasing said switch means to said no-load position thereof, and said biasing means being of a predetermined force maintaining said switch means in said no-load position over a predetermined small range of movement of said lever from said no-load balance position to maintain said blocking operation of said switch means except when the load on said platter is in excess of a corresponding predetermined small weight.

13. A power operated scale adapted for the rapid weighing of a series of loads and having a weighing mechanism including a platter and a lever adapted to occupy a no-load balance position and to be deflected to a new balance position corresponding to the load on said platter, comprising a reversible drive motor having a shaft adapted to be displaced from a no-load balance position to a balance position corresponding to the weight on said platter, control means actuated in response to deflections of said lever for selectively controlling the energization of said motor to cause displacement of said shaft in an amount proportional to the load on said platter, mechanism operated by said shaft in response to establishment of a balance position thereof for automatically producing an indication of the weight corresponding to said balance position, switch means adapted to occupy a no-load position in the absence of a load on said platter and movable to a load position in response to the presence of a load on said platter, means responsive to movement of said switch means from said load position to said no-load position thereof for effecting a delayed return of said shaft to its no-load position pending the application of another load to said platter, and means actuated by said switch means in said no-load position thereof for blocking operation of said indicating mechanism to prevent said automatic operation of said indicating mechanism upon establishment of said no-load balance position of said shaft.

14. A power operated scale adapted for the rapid weighing of a series of loads and having a weighing mechanism including a platter and a lever adapted to occupy a no-load balance position and to be deflected to a new balance position corresponding to the load on said platter, comprising a reversible drive motor having a shaft adapted to be displaced from a no-load balance position to a balance position corresponding to the weight on said platter, control means actuated in response to deflections of said lever for selectively controlling the energization of said motor to cause displacement of said shaft in an amount proportional to the load on said platter, mechanism operated by said shaft in response to establishment of a balance position thereof for automatically producing an indication of the weight corresponding to said balance position, switch means adapted to occupy a no-load position in the absence of a load on said platter and movable to a load position in response to the presence of a load on said platter, means responsive to movement of said switch means from said load position to said no-load position thereof for effecting a delayed return of said shaft to its no-load position pending the application of another load to said platter, means actuated by said switch means in said no-load position thereof for blocking operation of said indicating mechanism to prevent said automatic operation of said indicating mechanism upon establishment of said no-load balance position of said shaft, means biasing said switch means to said no-load position thereof, and said biasing means being of a predetermined force maintaining said switch means in said no-load position over a predetermined small range of movement of said lever from said no-load balance position to maintain said blocking operation of said switch means except when the load on said platter is in excess of a corresponding predetermined small weight.

15. A power operated scale adapted for the rapid weighing of a series of loads and having a weighing mechanism including a platter and a lever adapted to occupy a no-load balance position and to be deflected to a new balance position corresponding to the load on said platter, comprising follow-up means adapted to be displaced from a no-load balance position to a balance position corresponding to the weight on said platter, control means actuated in response to deflections of said lever for selectively effecting displacement of said follow-up means in an amount proportional to the load on said platter, switch means adapted to occupy a first position whenever said follow-up means is within a predetermined small range of movement from said no-load position thereof corresponding to a predetermined small weight on said platter, said switch means being movable to a second position in response to the presence of a load on said platter in excess of said predetermined small weight, mechanism operated by said follow-up means in response to establishment of a balance position thereof for automatically producing an indication of the weight corresponding to said balance position when said switch means is in said second position thereof, and means actuated by said switch means in said first position thereof for blocking operation of said indicating mechanism upon establishment of a balance position of said follow-up means within said small range of movement.

16. A power operated scale adapted for the rapid weighing of a series of loads and having a weighing mechanism including a platter and a lever adapted to occupy a no-load balance position and to be deflected to a new balance position corresponding to the load on said platter, comprising a reversible drive motor having a shaft adapted to be displaced from a no-load balance position to a balance position corresponding to the weight on said platter, control means actuated in response to deflections of said lever for selectively controlling the energization of said motor to cause displacement of said shaft in an amount proportional to the load on said platter, switch means adapted to occupy a first position whenever said shaft is within a predetermined small range of movement from said no-load position thereof corresponding to a predetermined small weight on said platter, said switch means being movable to a second position in response to the presence of a load on said platter in excess of said predetermined small weight, mechanism operated by said shaft in response to establishment of a balance position thereof for automatically producing an indication of the weight corresponding to said balance position when said switch means is in said second position thereof, and means actuated by said switch means in said first position thereof for blocking operation of said indicating mechanism upon establishment of a balance position of said shaft within said small range of movement.

17. A power operated scale adapted for the rapid weighing of a series of loads and having a weighing mechanism including a platter and a lever adapted to occupy a no-load balance position and to be deflected to a new balance position corresponding to the load on said platter, comprising follow-up means movable in conjunction with said lever from a no-load balance position to a balance position corresponding to the weight on said platter, printing means operated in response to establishment of a balance position of said follow-up means for automatically producing a printed record of the weight corresponding to said balance position, switch means adapted to occupy a no-load position in the absence of a load on said platter and movable to a load position in response to movement of said weighing mechanism caused by the presence of a load on said platter, means actuated by said switch means in said no-load position thereof for blocking operation of said printing means to prevent said automatic operation of said printing means upon establishment of said no-load balance position of said follow-up means, means biasing said switch means to said no-load position thereof, and said biasing means being of a predetermined force maintaining said switch means in said no-load position over a predetermined small range of movement of said lever from said no-load balance position to maintain said blocking operation of said switch means except when the load on said platter is in excess of a corresponding predetermined small weight.

References Cited in the file of this patent

UNITED STATES PATENTS

| Number | Name | Date |
|---|---|---|
| 806,752 | Pevear | Dec. 5, 1905 |
| 1,274,209 | Tatum | July 30, 1918 |
| 1,344,339 | Foote | June 22, 1920 |
| 1,352,880 | Davis | Sept. 14, 1920 |
| 1,629,221 | MacNutt | May 17, 1927 |
| 1,690,679 | Hebden | Nov. 6, 1928 |
| 1,838,084 | Drake | Dec. 29, 1931 |
| 2,040,072 | Brendel | May 12, 1936 |
| 2,346,117 | Stabler | Apr. 4, 1944 |
| 2,392,023 | Cooper | Jan. 1, 1946 |
| 2,530,749 | Yardeny | Nov. 21, 1950 |
| 2,615,148 | Critoph | Oct. 21, 1952 |
| 2,678,206 | Muldoon | May 11, 1954 |
| 2,751,538 | Beitz | June 19, 1956 |

UNITED STATES PATENT OFFICE
CERTIFICATE OF CORRECTION

Patent No. 2,948,523                 August 9, 1960

Kenneth C. Allen

It is hereby certified that error appears in the printed specification of the above numbered patent requiring correction and that the said Letters Patent should read as corrected below.

Column 6, line 1, strike out "place. As the balance point is approached, contacts" and insert the same after "operations takes" in line 75, same column 6; column 12, line 16, after "mechanism" strike out the comma.

Signed and sealed this 4th day of April 1961.

(SEAL)
Attest: ERNEST W. SWIDER

~~XMRXMXXMKMX~~
Attesting Officer

ARTHUR W. CROCKER
Acting Commissioner of Patents